United States Patent Office 3,389,392
Patented June 18, 1968

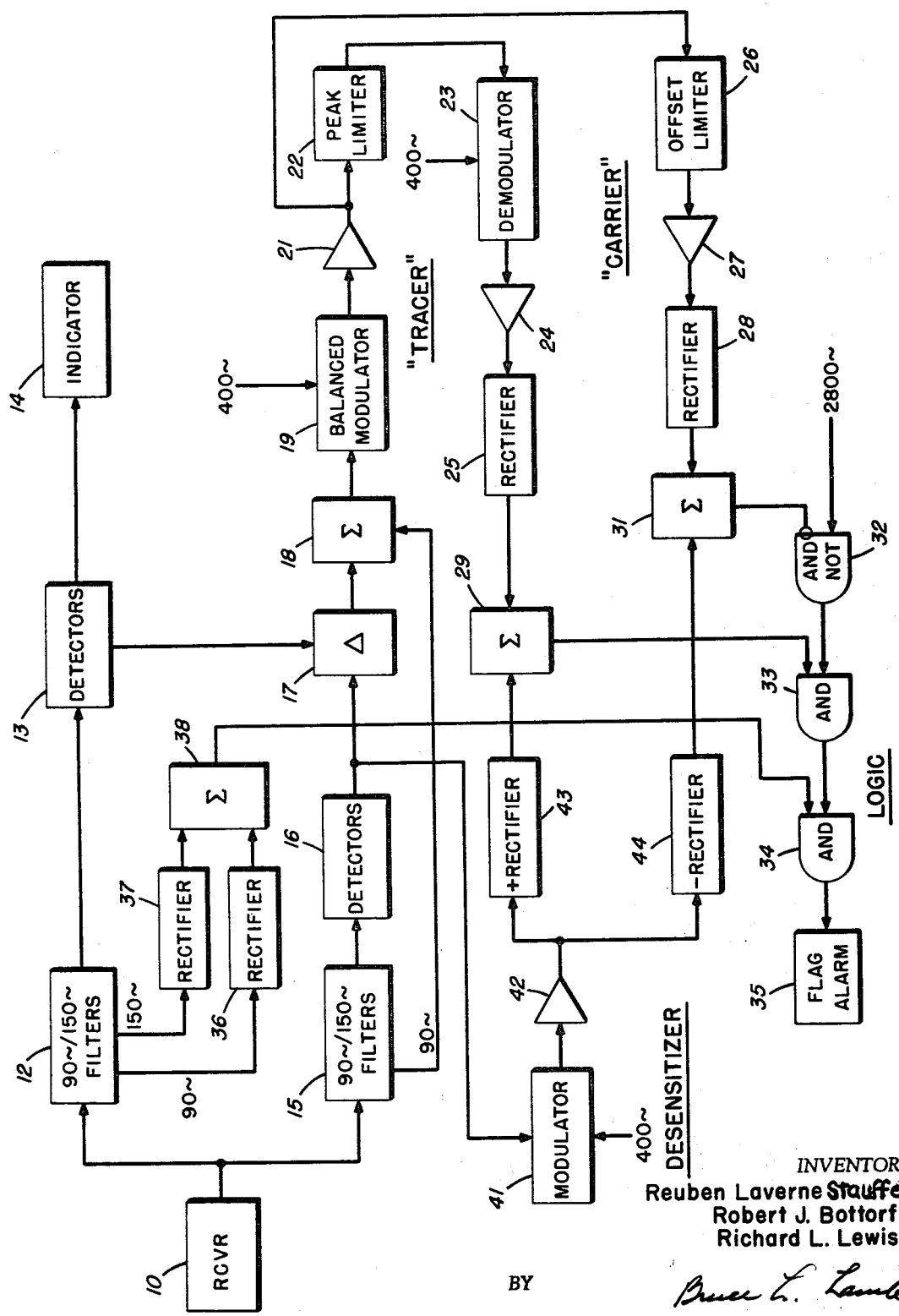

3,389,392
INTEGRITY MONITOR ILS NAVIGATION RECEIVER
Reuben L. Stauffer, Robert J. Bottorf, and Richard L. Lewis, Baltimore, Md., assignors to The Bendix Corporation, Baltimore, Md., a corporation of Delaware
Filed May 4, 1967, Ser. No. 636,115
12 Claims. (Cl. 343—108)

ABSTRACT OF THE DISCLOSURE

Integrity monitor system for ILS receivers which compares outputs of duplicate indicator signals, a substantial difference in which represents receiver fault. Difference is applied to balanced modulator causing tracer signal to disappear and carrier signal to appear, either event causing warning flag to appear.

---

The present invention relates broadly to aircraft radio receivers and more particularly to a fail-safe monitoring system for continuously proving the integrity of the receiver when used for instrument landings.

The most common method of guiding aircraft to safe landings in conditions of poor visibility is the fixed beam, low approach system now known generally as the instrument landing system (ILS). In this system a guidance plane (localizer) for aligning the aircraft in azimuth with the centerline of the runway is created by projecting two beams having their maximum power axes slightly askew of the runway centerline. Opposite sides of the beams are overlapped along the runway so that equal power from both beams is received only when the aircraft is positioned in a vertical plane which also contains the runway centerline. The beams are identified by tone modulation, commonly at 90 cps. and 150 cps. so that the aircraft need only be equipped with a receiver having filters for separating the tones in the receiver output and an indicator to which the separated tones are differentially applied. The pilot maneuvers the aircraft to maintain minimum deflection of the indicator, thereby setting the course of the craft towards the runway centerline.

Similarly, two beams are projected in space with their axes lying in the same vertical plane but at different elevation angles so that equal power points of the beams define a glide slope plane askew to the runway surface. The latter beams are likewise identified by 90 cps. and 150 cps. tones on the same carrier frequency which is different, however, from the localizer carrier frequency. The aircraft equipment again need only consist of a receiver, tone filters and an indicator. When the aircraft is maneuvered for minimum deflection of the indicator, the craft will descent from altitude within the glide slope plane to a touchdown point at or near the runway end.

Obviously, disaster attends the failure of either the localizer or glide slope equipments during blind landing procedures. Heretofore methods have been sought to warn a pilot of equipment failure in time to permit breakoff of the letdown procedure, so that the pilots remaining hope would be to reach an airport open for visual landings. One such system included entirely separate pairs of localizer and glide slope receivers. The outputs of these separate receivers were continuously compared and whenever an intolerable difference appeared an alarm of equipment failure was given. The system was generally unsatisfactory because large differences could appear in the outputs of two normally operating receivers and trigger a false alarm. For example, the aircraft might maneuver in such a way that the signal to one localizer receiver is temporarily diminished, while that to the other localizer receiver is increased, thus producing a large error signal and consequent alarm. Such conditions require that the difference tolerance be so great that the system cannot detect equipment failures within the safety margin required for present day aircraft. Another shortcoming of prior monitoring systems was their lack of fail-safe protection features. That is, if the monitoring relies solely upon the equality of inputs as the safety criterion, total failure of the equipment cannot be distinguished from perfectly operating equipment. Moreover, prior systems failed to provide assurance that the monitoring devices themselves were operative.

It is therefore the principal object of this invention to provide a monitoring system for aircraft navigational receivers to assure the pilot that reliable course indications are being delivered by the equipment.

It is a further object of the invention to provide a monitoring system which operates automatically and continuously, thereby relieving the pilot of the added burden of equipment tests or checks. Such relief is particularly beneficial during the hazardous flying conditions under which the equipment would be most likely used.

Another object of the invention is to provide a monitoring system adapted to detect faults in navigational receivers when used to provide bearings from omni-ranges instead of localizer flight path indications.

Still another object is to provide a monitoring system sensitive to faults within itself, thus guaranteeing the integrity both of the navigational equipment and the monitoring system.

Other objects and attendant advantages of the invention will become evident as understanding of its structure and functions is gained through study of the detailed description thereof and the accompanying drawings.

In brief summary, the invention comprises a navigational receiver providing an output signal composed of the 90 cps. and 150 cps. guidance tones. The tones are separated by filters following which rectifiers produce direct currents which are proportional to the respective tone amplitudes. These currents are applied differentially to a galvanometer which deflects on either side of a central equilibrium position to indicate the direction in which the aircraft must be steered to return to course. Duplicate tone filters and rectifiers supply current to a dummy load simulating the indicator. A comparison signal comprising the difference between the indicator current and the dummy load current, together with a portion of the output of one of the tone filters is applied to a balanced modulator operating with a 400 cps. carrier. The comparison signal appears as sidebands of the 400 cps. carrier. The tone component of the comparison signal assures that some output will be obtained from the modulator when there is no difference between the indicator and dummy load currents. The modulator output, when there is no difference between indicator and dummy load currents, consists of the tone (conveniently 90 cps.) double sidebands of the 400 cps. carrier, with the carrier itself suppressed. The modulator output is synchronously detected to recover the 90 cps. tone as an alternating current wave. Rectification of this signal produces an output when the difference between indicator and dummy load currents is zero. This output has been designated as the tracer signal.

When the difference between indicator and dummy load currents is not zero, the comparison signal includes components whose frequencies may approach zero. The sidebands of the modulator output then approach the carrier frequency, and when they exceed the amplitude of the 90 cps. sidebands, the 90 cps. appears as an envelope of amplitude modulation on a 400 cps. carrier. As the difference between indicator and dummy load currents increases, the peak amplitude of the 400 cps. signal from the modulator increases, while the absolute depth of the 90 cps. modulation remains constant. Eventually the peak amplitude exceeds the threshold of a peak limiter inserted in front of the 90 cps. detector. The 90 cps. modulation is then clipped off, and the tracer output drops to zero. Disappearance of the tracer triggers the failure alarm circuits of the system.

For added safety, the output of the modulator is also fed to a circuit designated the "carrier" channel. This channel consists of an offset limiter and a rectifier. The offset limiter is the complement of the peak limiter, i.e. signals having amplitudes greater than a certain threshold are passed, while signals having amplitudes below that threshold are rejected. A zero output from the "carrier" channel indicates a satisfactory condition, and a non-zero output indicates an unsatisfactory condition. The logic circuit to which both "carrier" and "tracer" outputs are applied is arranged to trigger the warning circuits upon the occurrence of either a zero "tracer" condition or a non-zero "carrier" condition.

The single figure of the drawings is a functional block diagram of the invention.

Referring to the drawing, a receiver 10, which is either the localizer or glide slope receiver, provides audio tones of 90 and 150 cps. at its output. The relative amplitude of these tones is dependent upon the location of the aircraft relative to the axis of the glide slope or localizer beam. The tones are separated by filters 12, separately rectified by detectors 13, which provide direct currents proportional to the relative amplitudes of the tones, and differently applied to the flight path deviation indicator 14. This arrangement constitutes the standard glide slope or localizer instrument landing system. The audio output of receiver 10 is fed to a duplicate pair of filters 15 which separate the tones in the same manner as filters 12. The output of filters 15 are rectified in detectors 16 to provide direct voltages proportional to the respective tone amplitudes. For a properly functioning system the output of detectors 13 and 16 should be identical. To test the identity of these outputs, the differential signals from detectors 13 and 16 are applied to a difference network 17. The output of difference network 17 is then combined with a portion of the 90 cps. signal from filter 15 in a summing network 18. For properly operating equipment the output of network 18 will consist only of the 90 cps. signal since the output from difference network 17 is zero. If a fault should develop in the system, for example in the 150 cps. filter 12, the output of difference network 17 is no longer zero and the output of summing network 18 becomes a biased 90 cps. signal. The output of summing network 18 is applied to a balanced modulator 19 operating with a 400 cps. carrier. So long as the input to modulator 19 is balanced, the output consists of the 310 cps. and 490 cps. sidebands with the carrier suppressed. The output of modulator 19 is amplified at 21 peak limited at 22, and applied to a synchronous demodulator 23 which reinserts the 400 cps. carrier to produce at its output, under normal conditions, a 90 cps. signal. The 90 cps. demodulator output is amplified at 24 and rectified at 25 to produce a direct voltage. The circuit which comprises limiter 22, demodulator 23, amplifier 24, and rectifier 25 constitutes the "tracer" channel of the system.

The output of amplifier 21 is also applied to an offset limiter 26 which passes only those signals having an amplitude in excess of a predetermined threshold. The output of limiter 26, when present, is amplified at 27 and rectified at 28 to produce a direct voltage. The circuit comprising limiter 26, amplifier 27, and rectifier 28 constitutes the "carrier" channel of the system.

As briefly explained above, whenever the output of difference network 17 is zero the output of modulator 19 consists only of the 310 cps. and 490 cps. sidebands. These will pass limiter 22 and become demodulated and rectified to produce a positive direct voltage at the output of rectifier 25. Whenever the output of difference network 17 grows to a substantial magnitude the input to modulator 19 becomes unbalanced with the result that a substantial carrier component of 400 cps. appears in the modulator output. The spectrum of the modulator output then combines to produce a wave comprised of a 400 cps. carrier with 90 cps. amplitude modulation imposed thereon. The greater the unbalance to the modulator input, the lower will be the percent modulation of its output. The 90 cps. modulation will be eliminated from the wave by the action of peak limiter 22 with the consequence that the input to demodulator 23 then comprises only a 400 cps. signal. This produces a direct current or a very low frequency alternating current, if the output of network 17 is of such character, from the demodulator 23. An output of this form will be blocked by amplifier 24 with the result that the output of rectifier 25 disappears. At the same time the increased signal amplitude from amplifier 21 will exceed the threshold of limiter 26, pass through amplifier 27 and appear as a direct voltage at the output of rectifier 28.

The "tracer" channel and "carrier" channel outputs are applied through summing networks 29 and 31, the function of which will shortly be described, to the warning logic circuits. Under normal conditions, output will be present from network 29 and absent from network 31. The logic comprises "and not" gate 32, "and" gate 33, and "and" gate 34 connected to inhibit the operation of a flag alarm circuit 35. Comparatively high frequency audio signal, suitably 2800 cps., is applied to gate 32 which is enabled by the absence of output from network 31. This audio signal then appears at the input to "and" gate 33 which is enabled by the presence of output from network 29 to pass the high frequency A.C. to "and" gate 34. Rectifiers 36 and 37 respectively receive 90 and 150 cps. tones from guidance filters 12. The outputs of these rectifiers are added in summing network 38, then applied to enable gate 34. Should either of the guidance tones disappear gate 34 becomes non-conductive and the 2800 cps. inhibiting signal is removed from flag alarm 35, resulting in the appearance of a warning flag.

In order to prevent the appearance of false alarms when the aircraft is some distance off course, a desensitizer circuit is provided. A portion of the differentially combined outputs of detectors 16, which is a voltage having a sense and magnitude dependent upon the direction and distance of the aircraft from the guidance beam axis, is applied to a balanced modulator 41. When a large guidance error is present the output of modulator 41 is similar to the output of modulator 19 when a large output appears from difference network 17. This constitutes a substantial 400 cps. carrier component which may be amplitude modulated at a very low frequency. The output of modulator 41 is amplified at 42 and applied to a positively poled rectifier 43 and a negatively poled rectifier 44. The outputs of these rectifiers are respectively applied to summing networks 29 and 31. The magnitudes of the outputs of rectifiers 43 and 44 increase in proportion to the magnitude of the aicraft guidance error during which the probability of an increase in the output of difference network 17 simultaneously becomes greater for a perfectly functioning system. Increased output from difference network 17 tends to cause decrease in output from rectifier 25, the "tracer" output, and increase in output from rectifier 28, the "carrier" output. When a large guidance error exists the increased output of rectifier 43 tends to overcome the probable simultaneous decrease from rectifier 25, thereby maintaining "and" gate 33 enabled. The probable increase in output from rectifier 28 is likewise offset by the increased negative output of rectifier 44, thereby maintaining "and not" gate 32 enabled. Thus the system is made to function most critically whenever the aircraft nears the axis of the guidance beam and greatest accuracy is demanded.

Utilization of A.C. in the logic circuit to inhibit the appearance of the flag alarm is an additional "fail-safe" feature of the system. Should any of the gates fail the fault would most probably be such as to block transmission of the A.C. signal, thereby triggering the alarm.

The invention claimed is:

1. A monitoring system for radio receivers providing an audio frequency output signal, comprising a separate audio frequency channel normally providing an audio frequency signal which duplicates the audio frequency signal output of said receiver;

means for comparing said duplicate signal with said receiver output signal;

a balanced modulator having a carrier input and an input from said comparing means to provide a suppressed carrier output in the absence of signal from said comparing means; and means including a logic circuit for generating an alarm upon the appearance of a substantial component of carrier frequency in the output of said modulator.

2. A monitoring system as claimed in claim 1, with additionally, an additional signal input to said modulator to provide in the absence of output from said comparing means suppressed carrier output with sideband components dependent upon said additional signal; and means controlled by the presence of said sideband components and cooperating with said logic circuit for inhibiting said alarm means.

3. A monitoring system as claimed in claim 2, with additionally, means responsive to the magnitude of said receiver output signal for proportionately reducing the sensitivity of said alarm generating means.

4. An integrity monitoring system for an aircraft navigation receiver which provides a guidance signal by the comparison of the magnitude tone modulation signals, comprising means in said receiver providing a second guidance signal which normally duplicates the first guidance signal thereof utilized for navigation;

means for comparing said first and second guidance signals;

a modulator having a higher frequency carrier input; an input from said comparing means; and a lower frequency tone input and providing an output having a suppressed carrier and sidebands of said tone whenever the magnitude of input from said comparing means is insubstantial and having a carrier component whenever the magnitude of input from said comparing means is substantial;

means for separting sideband components and carrier components from the output of said modulator;

alarm generating means; and logic means responsive to said separated sideband and carrier components for controlling said alarm.

5. A monitoring system as claimed in claim 4, with additionally, means responsive to the magnitude of one of said guidance signals for proportionately desensitizing said logic means.

6. A system as claimed in claim 4 wherein said separating means includes a demodulator receiving output from said modulator, said demodulator being synchronously controlled at the same frequency as the carrier of said modulator for recovering signal at the frequency of said modulator tone input; and limiting means and rectifying means receiving output from said modulator for providing an output only upon the appearance of a substantial carrier frequency component in the output of said modulator.

7. A system as claimed in claim 6, with additionally peak limiting means for limiting the magnitude of input to said demodulator.

8. A system as claimed in claim 6 wherein said limiting means is arranged to block signals to said rectifying means whenever the magnitude of such signals is below a certain threshold level.

9. An integrity monitoring system for ILS receivers having tone separation filters in the output and course indicating means controlled by the relative amplitudes of the separated tones, comprising additional tone separation filters connected to the receiver output to provide tones normally duplicating the tones utilized for guidance;

means for converting said duplicate tones into a signal which duplicates the control signal for said course indicating means;

means providing the difference between the control signal for said course indicating means and the duplicate thereof;

a balanced modulator having a tracer signal input from one of said tone separation filters, an input from said difference means, and a carrier input of higher frequency than said tracer signal;

a demodulator controlled in synchronism with said modulator carrier for recovering signal at the frequency of said tracer signal from the output of said modulator;

rectifying means for converting said recovered tracer frequency signal into a first direct current;

means for converting the outputs of said modulator which exceeds the amplitude of the tracer signal component of said modulator output into a second direct current;

alarm means; and logic means, said logic means having an alternating current signal applied thereto and normally conducted thereby for inhibiting the operation of said alarm means; said logic means being non-conductive in the absence of said first direct current or in the presence of said second direct current.

10. A monitoring system as claimed in claim 9, with additionally, peak limiting means for limiting the amplitude of output from said modulator applied to said demodulator.

11. A monitoring system as claimed in claim 9 with additionally a second modulator having as an input a signal which is proportional to the control signal for said course indicating means;

means receiving the output of said second modulator to provide third and fourth direct currents;

means combining said first and third direct currents in aiding relationship; and means combining said second and fourth direct currents in opposing relationship.

12. A monitoring system as claimed in claim 11 with additionally, peak limiting means for limiting the amplitude of output from said modulator applied to said demodulator.

References Cited

UNITED STATES PATENTS

| | | | |
|---|---|---|---|
| 2,438,288 | 3/1948 | Jacobson et al. | 325—363 X |
| 2,704,647 | 3/1955 | Meyers et al. | 343—107 X |
| 3,110,028 | 11/1963 | Noyes | 343—107 |
| 3,323,125 | 5/1967 | Lunn et al. | 343—108 |

RODNEY D. BENNETT, *Primary Examiner.*

H. C. WAMSLEY, *Assistant Examiner.*